Feb. 24, 1959  E. A. BELOIAN  2,874,608
MONOCHROMATOR OPTICAL SYSTEM
Filed May 17, 1954

INVENTOR.
EDWARD A. BELOIAN
BY
James B. Christie
ATTORNEY

United States Patent Office 2,874,608
Patented Feb. 24, 1959

2,874,608

MONOCHROMATOR OPTICAL SYSTEM

Edward A. Beloian, Pasadena, Calif.

Application May 17, 1954, Serial No. 430,230

5 Claims. (Cl. 88—14)

My invention relates in general to spectroscopy and more particularly to an improved monochromator of the reflecting dispersing type.

In order to distinguish the present invention from conventional monochromators it is necessary to consider the principal features of the latter briefly. A conventional monochromator of the reflecting dispersing type includes an entrance slit admitting a beam of light rays or rays of other radiant energy from a suitable source, and a collimating mirror which reflects and collimates the admitted or entrant rays onto a reflecting dispersing element. The element is usually a prism such as crystal quartz or the like, which spectrally disperses the beam of entrant rays and reflects them back toward the collimating mirror. The mirror focuses the collimated dispersed rays (now termed emergent rays) as a spectrum, a portion of which passes through an exit slit. The prism is rotatable so that radiation at any desired wavelength or waveband may be focused on the exit slit by way of the collimating mirror and transmitted to a receiver.

A conventional monochromator of the reflecting dispersing prism type has its components arranged so that the entrant rays enter the prism at substantially the angle of minimum deviation at all wavelengths. In the case of crystal quartz prisms of the reflecting type which have their optic axes normal to their reflecting surfaces, birefringent characteristics of such a prism make it important to direct the collimated rays so that they enter and leave the prism in planes which are parallel to the refracting edge of the prism and normal to its reflecting surface. This condition must be maintained in order to minimize the effects of birefringence. But, if this condition is maintained in conventional monochromators, off-axis aberrations associated with the commonly used spherical collimating mirror are increased because of the nonsymmetrical path of entrant and emergent rays. Use of the same mirror for collimating both entrant and emergent rays whether the mirror be spherical or paraboloidal, means that a substantial amount of scattered light (due to inherent optical properties and surface imperfections) will pass through the exit slit and impinge on the associated receiver. Scattered or spurious light superposed on the spectrum from the optical elements or from aberrant rays materially reduces the purity of the spectrum at the exit slit and may also decrease the energy at the desired wavelength which is available at the exit slit and represents a serious deficiency in conventional prism monochromators. The light from the undispersed entrant rays is very intense compared to the dispersed light of the wavelength or waveband desired at the exit slit, so that scattered light from the undispersed rays interferes markedly with precise observations at the exit slit. This undispersed scattered light cannot successfully be baffled from the exit slit in the conventional monochromator because both emergent (dispersed) and entrant (undispersed) beams emanate from the same collimating mirror.

The apparatus of the invention overcomes these objections to conventional monochromators while maintaining the conditions necessary to minimum deviation with respect to the dispersing element of the monochromator.

My invention comprises means defining an entrance slit for admitting a beam of radiant energy, a first collimating mirror oriented to receive and collimate the beam of energy, a dispersing element which is positioned with respect to the first collimating mirror so that the collimated beam from the mirror impinges upon the dispersing element at substantially the angle of minimum deviation, a second collimating mirror oriented to receive the dispersed collimated beam of energy from the dispersing element, and means forming an exit slit positioned to transmit a portion of the focused dispersed beam from the second collimating mirror. In one aspect of my invention the collimating mirrors lie on opposite sides of the plane of dispersion of the dispersing element. In another aspect of my invention, two baffles are employed, one of which is located on the line joining the first collimating mirror with the exit slit, and the other of which is located on the line joining the second collimating mirror with the entrance slit.

Use of separate mirrors for collimating the entrant and emergent beams, respectively, has many advantages over the present conventional single collimating mirror system. The apparatus of the invention enables the path of the entrant beam from the entrance slit to the dispersing element and the path of the emergent beam from the element to the exit slit to be symmetrical, and off-axis aberrations are thereby substantially cancelled. The two beams are separable and scattered light from one beam can be baffled without interfering with the second beam.

When so baffled, the scattered light that comes from the entrant collimating mirror does not fall on the exit slit, as is the case in a conventional monochromator wherein the same mirror must reflect both undispersed and dispersed light.

The decrease in the amount of scattered or spurious light that arrives at the exit slit results in an increase in the relative ratio of the desired radiation of a specific wavelength or waveband to the undesired radiant energy of other wavelengths which arrive at the exit slit, enabling more accurate measurement of the intensity of radiation in the weaker portions of the spectrum to be made. Although the foregoing description refers to light passing through a monochromator, the principles involved in the invention apply equally to any observable beams in the radiant energy spectrum.

In the most effective way of practicing the invention a crystal quartz prism is used as the dispersing element in the monochromator of the invention. Therefore, this embodiment of the invention comprises an adjustable entrance slit that admits an entrant beam of light, a first collimating mirror oriented to receive the entrant beam and a crystal quartz prism that has a refractive first surface and a reflective second surface. The optic axis of the prism is normal to the reflective second surface and the apex, or refracting edge, of the prism is adjacent the entrance slit, and the base of the prism is adjacent the exit slit. A second collimating mirror is oriented to receive the collimated dispersed rays, and an adjustable exit slit is located on the base side of the prism and positioned to transmit a portion of the focused dispersed beam from the second collimating mirror. The entrance and exit slits are positioned so that the entrant and emergent beams are at substantially equal off-axis angles with respect to their respective collimating mirrors.

The previously recounted advantages of the invention are described in more detail in the accompanying specification and drawing, in which.

Figure 1:
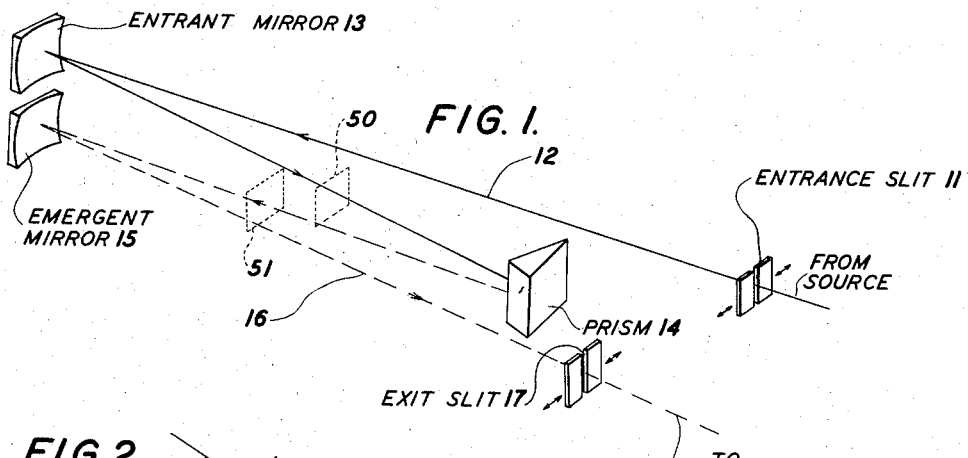
Fig. 1 is a perspective diagram of the main elements of an embodiment of the invention.

In Fig. 1 an adjustable entrance slit 11 admits a beam of radiant energy from a suitable source (not shown). The path of the beam is represented in Fig. 1 by a single line for simplicity. Entrant beam 12 passes from the entrance slit to an entrant spherical collimating mirror 13 which collimates and reflects the beam to a crystal quartz prism 14. The prism reflects and disperses the collimated entrant beam spectrally in the direction of an emergent spherical collimating mirror 15. Emergent beam 16 of the dispersed beam is illustrated in Fig. 1 as a broken line. The emergent beam reflects from the emergent mirror and passes through an adjustable exit slit 17 to a receiver which is not illustrated as it forms no part of this invention though normally used therewith.

The prism is located in the monochromator so that each ray of the entrant beam and the emergent beam traverses the prism along a path nearly parallel to the optic axis in a plane that is substantially parallel to the refracting edge of the prism and normal to its reflecting surface, the optic axis of the prism being normal to its reflecting surface also. In this manner birefringent effects are limited to the vertical plane and are negligible in the device of the invention. In this application and in the claims, a plane which is parallel to the refracting edge of the prism 14 is termed a vertical plane, and a plane which is perpendicular thereto, is termed a horizontal plane.

Figure 2:
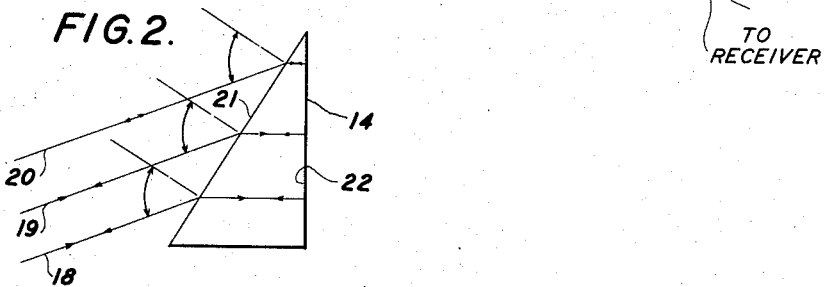
Fig. 2 is a diagram of ray paths in a principal section of the prism in the monochromator of Fig. 1.

Fig. 2 illustrates the projection of the paths of a group of such rays 18, 19, 20 onto a principal section of prism 14. The rays enter front face 21 of the prism at substantially equal incident angles and impinge on a reflective rear surface 22 at an angle of incidence of 0°, i. e. the projected path of the rays is normal to the rear surface.

Under these conditions the rays enter and leave the prism with minimum deviation.

Figure 3:
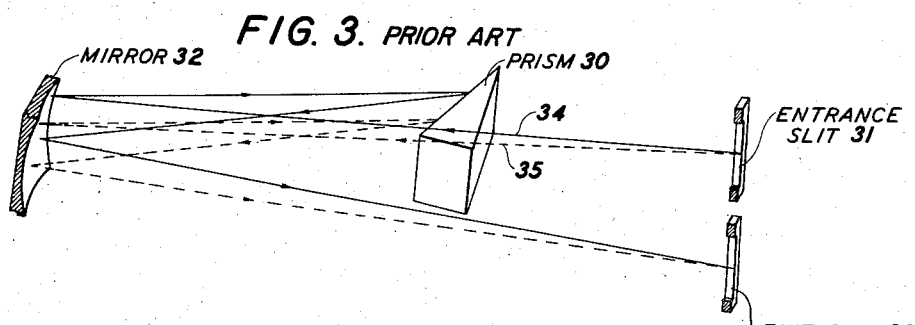
Fig. 3 is a perspective diagram of a conventional prior art monochromator, illustrating the ray paths.

In Fig. 3 a prism 30 is positioned for minimum deviation in a conventional monochromator. The monochromator comprises, in addition to the prism, an entrance slit 31, a spherical collimating mirror of which a central portion 32 is shown, and an exit slit 33. These are the commonly used components of a conventional monochromator.

The edge rays of a radiant energy beam are shown as representative of the beam entering the monochromator at slit 31. An edge ray 34 is illustrated as a full line while its complementary edge ray 35 is a dotted line. As the rays trace a path from the entrance slit to the mirror, from the mirror to the prism and back to the mirror and out through exit slit 33, it is apparent that the paths of the ray pair are not symmetrical. This is because the use of a single collimating mirror requires that entrant and emergent rays must both pass on either the base or apex side of the dispersing prism. Because the paths of the edge ray pairs are not symmetrical, the off-axis aberrations of the rays due to the spherical collimating mirror are increased.

Figure 4:
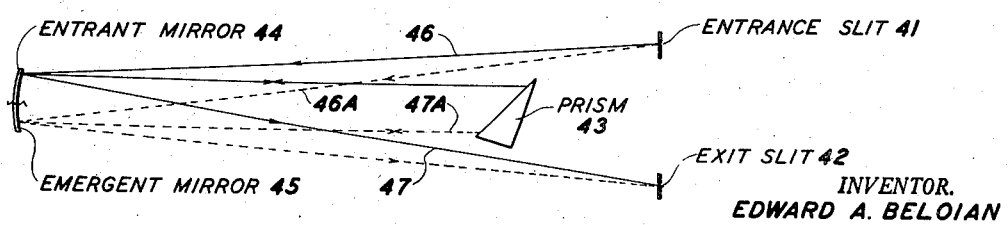
Fig. 4 is a plan diagram of the ray paths in the embodiment of the invention of Fig. 1.

Fig. 4 illustrates in a plan view how the use of two collimating mirrors gives a monochromator providing symmetrical paths for edge ray pairs which are representative of an entire beam, while still enabling the dispersing prism to be positioned for minimum deviation. An entrance slit 41 and an exit slit 42 are positioned on opposite sides of a crystal quartz dispersing prism 43. A pair of spherical collimating mirrors 44, 45 are positioned one above the other so that edge rays 46, 46A and emergent rays 47, 47A enter and emerge from the prism at minimum deviation. In Fig. 4 entrant mirror 44 is partially broken away to show a portion of emergent mirror 45.

As can be seen from Fig. 4, the paths of the pair of edge rays are symmetrical, and aberrational effects due to off-axis rays from the spherical collimating mirrors are substantially cancelled.

Reference to Fig. 1 illustrates the feasibility and the comparative simplicity of placing baffles 50, 51 below entrant beam 12 and above emergent beam 16 respectively on either side of a central line through the device to reduce the amount of scattered light falling on exit slit 17. The first baffle 50 is located on a line between the entrance slit 11 and the emergent mirror 15, but outside the cross-sectional area of the entrant beam 12. Likewise, the second baffle 51 is located on a line between exit slit 17 and the entrance mirror 13, but outside the cross-sectional area of the emergent beam 16. Thus, the first baffle 50 prevents stray radiation from traveling directly from the entrance slit 11 to the emergent mirror 15 where it would be subject to scattering toward the exit slit 17. Similarly, the second baffle 51 prevents white light which is scattered from the entrant mirror 13 from traveling directly to the exit slit 17. In other words, the entrance slit 17 is screened from direct view of the emergent mirror 15 by the baffle 50, and the exit slit 17 is screened from the direct view of the entrant mirror 13 by the baffle 51.

Thus, my invention provides a monochromator of high spectral purity in which scattering of light is reduced to a minimum, which is capable of operation with a dispersing element adjustable to minimum deviation for all wavelengths, and which substantially eliminates off-axis aberrations of conventional devices.

I claim:

1. A spectroscopic device comprising means defining an entrance slit for admitting an entrant beam of radiant energy, a first collimating mirror oriented to receive and reflect the entrant beam of energy, a dispersing element positioned with respect to the first collimating mirror so that a reflected collimated beam from the first mirror impinges upon the dispersing element, a second collimating mirror oriented to receive and reflect a dispersed collimated beam of energy from the dispersing element, and means defining an exit slit positioned to transmit as an emergent beam a portion of the dispersed beam reflected from the second collimating mirror and focussed on the exit slit, said collimating mirrors lying on opposite sides of the plane of dispersion of the dispersing element and one above the other whereby corresponding rays in the entrant and emergent beams travel in substantially the same vertical planes.

2. A spectroscopic device comprising means defining an entrance slit for admitting an entrant beam of radiant energy, a first collimating mirror oriented to receive and reflect the entrant beam of energy, a dispersing element positioned with respect to the first collimating mirror so that a reflected collimated beam from the first mirror impinges upon the dispersing element, a second collimating mirror oriented to receive and reflect a dispersed collimated beam of energy from the dispersing element, and means defining an exit slit positioned to transmit as an emergent beam a portion of the dispersed beam reflected from the second collimating mirror and focussed on the exit slit, said collimating mirrors lying on opposite sides of the plane of dispersion of the dispersing element and one above the other whereby corresponding rays in the entrant and emergent beams travel in substantially the same vertical planes and said slits being so located that the entrant and emergent beams are at substantially equal off-axis angles with respect to their respective collimating mirrors.

3. A spectroscopic device comprising means defining an entrance slit for admitting an entrant beam of radiant energy, a first collimating mirror oriented to receive and reflect the entrant beam of energy, a dispersing element positioned with respect to the first collimating mirror so that a reflected collimated beam from the first mirror impinges upon the dispersing element, a second collimating mirror oriented to receive and reflect a dispersed collimated beam of energy from the dispersing element, means defining an exit slit positioned to transmit as an emergent beam a portion of the dispersed beam reflected from the second collimating mirror and focussed on the exit slit, said collimating mirrors lying on opposite sides of the plane of dispersion of the dispersing element and one above the other, a first baffle disposed on the line between said second mirror and said entrance slit for screening said entrance slit from said second mirror without, however, cutting off said entrant beam, and a second baffle disposed on the line between said first mirror and said exit slit for screening said exit slit from said first mirror without, however, cutting off said portion of said dispersed beam.

4. A spectroscopic device comprising means defining an entrance slit for admitting an entrant beam of radiant energy, a first collimating mirror oriented to receive and reflect the entrant beam of energy, a dispersing prism having a refracting face and a reflecting face, said prism having an active horizontal plane normal to said two faces, said dispersing prism being positioned with respect to the first collimating mirror so that a reflected collimated beam from the first mirror impinges upon the refracting face of said prism and travels in said prism toward said reflecting face, a second collimating mirror oriented to receive and reflect a dispersed collimated beam of energy from said dispersing prism, and means defining an exit slit positioned to transmit as an emergent beam a portion of the dispersed beam reflected from the second collimating mirror and focussed on the exit slit, said collimating mirrors lying on opposite sides of the plane of dispersion of the dispersing prism and one above the other so that corresponding rays in the entrant and emergent beams travel in the prism in substantially the same vertical planes that are normal to said reflecting face and said slits being so located that the entrant and emergent beams are at substantially equal off-axis angles with respect to their respective collimating mirrors.

5. A spectroscopic device comprising means defining an entrance slit for admitting an entrant beam of radiant energy, a first collimating mirror oriented to receive and reflect the entrant beam of energy, a dispersing crystal quartz prism having a reflecting face normal to the optic axis of said prism and a refracting face inclined thereto, said prism having an active horizontal plane normal to said two faces, said crystal quartz prism being positioned with respect to the first collimating mirror so that a reflected collimated beam from the first mirror impinges upon the refracting face of said prism and travels in said prism toward said reflecting face, a second collimating mirror oriented to receive and reflect a dispersed collimated beam of energy from said quartz prism, and means defining an exit slit positioned to transmit as an emergent beam a portion of the dispersed beam reflected from the second collimating mirror and focussed on the exit slit, said collimating mirrors lying on opposite sides of the plane of dispersion of the dispersing prism and one above the other whereby corresponding rays in the entrant and emergent beams travel in substantially the same vertical planes and said slits being so located that the entrant and emergent beams are at substantially equal off-axis angles with respect to their respective collimating mirrors.

References Cited in the file of this patent

UNITED STATES PATENTS

| 2,664,024 | Hansen | Dec. 29, 1953 |
| 2,670,652 | Sherman | Mar. 2, 1954 |

FOREIGN PATENTS

| 657,264 | Germany | Feb. 28, 1938 |
| 1,010,764 | France | Mar. 26, 1952 |

OTHER REFERENCES

"Project d'um Monochromateur double de precision" Revue D'Optique, vol. 31, Issue 6, page 309, June 1952.